United States Patent

[11] 3,603,261

| [72] | Inventor | Wayne Melvin Mann<br>7111 Glass Slipper Way, Citrus Heights, Calif. 95601 |
|---|---|---|
| [21] | Appl. No. | 805,990 |
| [22] | Filed | Feb. 26, 1969 |
| [45] | Patented | Sept. 7, 1971<br>Continuation-in-part of application Ser. No. 632,884, Apr. 18, 1967, now abandoned. |

[54] HIGH SPEED GROUND TRANSPORTATION VEHICLE
6 Claims, 11 Drawing Figs.

[52] U.S. Cl. .................................................. 104/23 FS, 104/22, 104/23
[51] Int. Cl. .................................................. B61b 13/08
[50] Field of Search ........................................ 104/22, 23, 23 FS, 118

[56] References Cited

UNITED STATES PATENTS

| 1,733,270 | 10/1929 | Messer .......................... | 104/23 |
| 3,013,505 | 12/1961 | Burke ........................... | 104/23 FS |
| 3,444,823 | 5/1969 | Akmentin ...................... | 104/23 |
| 3,055,312 | 9/1962 | Jay .............................. | 104/23 FS |

FOREIGN PATENTS

| 203,845 | 3/1939 | Switzerland .................. | 104/22 |

*Primary Examiner*—Arthur L. La Point
*Assistant Examiner*—D. W. Keen
*Attorney*—Gordon Wood ABSTRACT: A vehicle adapted for high speed ground transportation in the 200 to 600 miles per hour range. The vehicle is connected to a track by arms adapted to permit the vehicle to move away from the track and become airborne. The connection to the track is by means of air pressure pads.

Wayne M. Mann
INVENTOR

INVENTOR.
WAYNE M. MANN

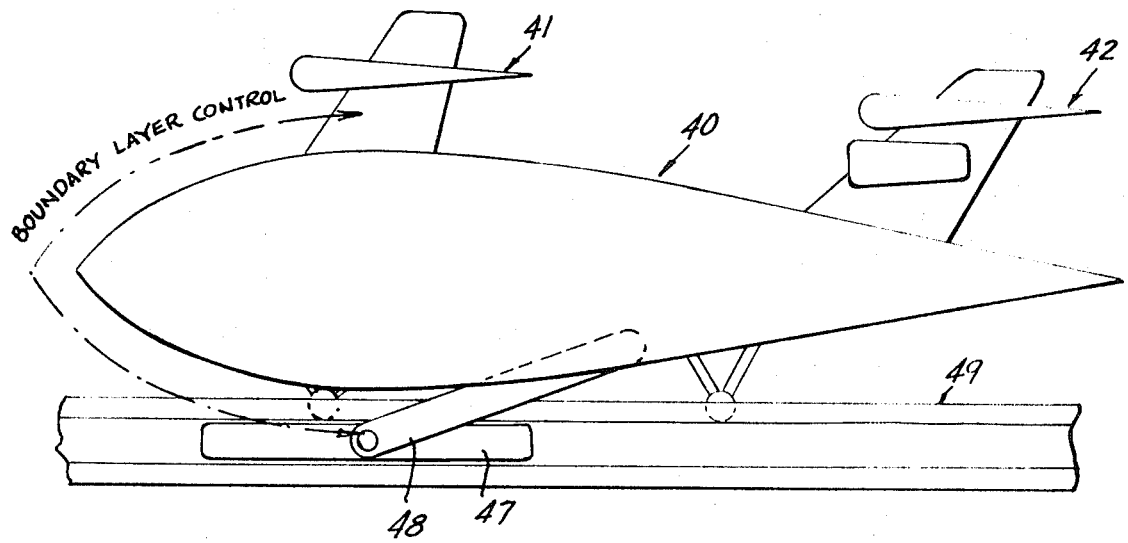
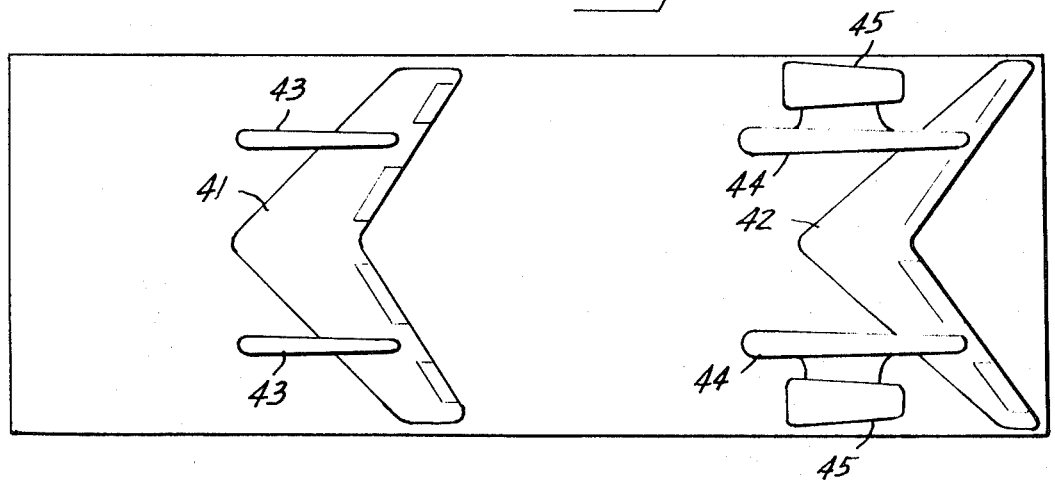

3,603,261

HIGH SPEED GROUND TRANSPORTATION VEHICLE

This is a continuation-in-part of Ser. No. 632,884, filed 4-18-67:

This invention relates to a high speed ground transportation system and more particularly to a vehicle adapted to move along the length of a track at relatively high speeds in the 200 to 600 miles per hour range.

Heretofore vehicles have been proposed which are adapted to move along the length of a track at a high speed without ground wheels with the vehicle being separated from the track by means of air cushions formed by high pressure air jets. Examples of U.S. patents showing such devices are U.S. Pat. No. 3,055,312 to Jay; U.S. Pat. No. 3,174,440 to Cockerell; and, U.S. Pat. No. 3,090,327 to Crowley.

In such prior art devices the spacing between the vehicle and the track remains substantially the same at all times and, in fact, great care is taken to prevent lifting of the vehicle off the track due to aerodynamic lift conditions at high speed. One of the disadvantages common to such prior art vehicles is that the proximity to the ground or to the track creates a considerable amount of resistance to movement which would not be present if the vehicles were spaced upwardly from the track.

Another disadvantage of these prior art vehicles is that since the weight of a vehicle must be counteracted by the pressure of the air cushion a large amount of power is expanded in merely holding the vehicle spaced slightly upwardly from the surfaces which it rides.

The main object of the present invention is the provision of a high speed ground transportation vehicle which overcomes the disadvantages of prior art devices of a similar nature.

Another object of the invention is the provision of a high speed ground transportation vehicle which is adapted to be airborne at high speed thus reducing the frictional effects which result from proximity to the ground and at the same time obtaining a lifting effect to counteract gravity thus saving power.

Another object of the invention is the provision of a high speed ground transportation system in which the vehicle may be supported by wheels on the track at low speeds and which may subsequently be raised off the track for movement as an air foil at high speeds.

Still another object of the invention is the provision of a high speed ground transportation vehicle in which the vehicle is airborne during most of its use and which is connected to the track by substantially frictionless air cushion pads.

Other objects and advantages of the invention will be apparent from the following specification and from the drawings:

FIG. 9 is a schematic side elevation of still another form of the invention employing a symmetrical airfoil body.

FIG. 10 is a schematic top plan view of the vehicle of FIG. 9.

Figure 1:
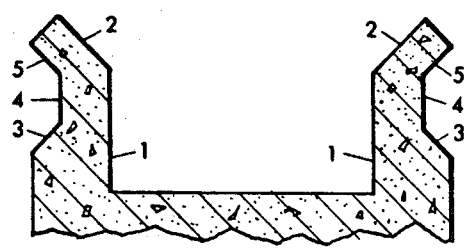
FIG. 1 is a transverse sectional view through one form of track.
Figure 5:
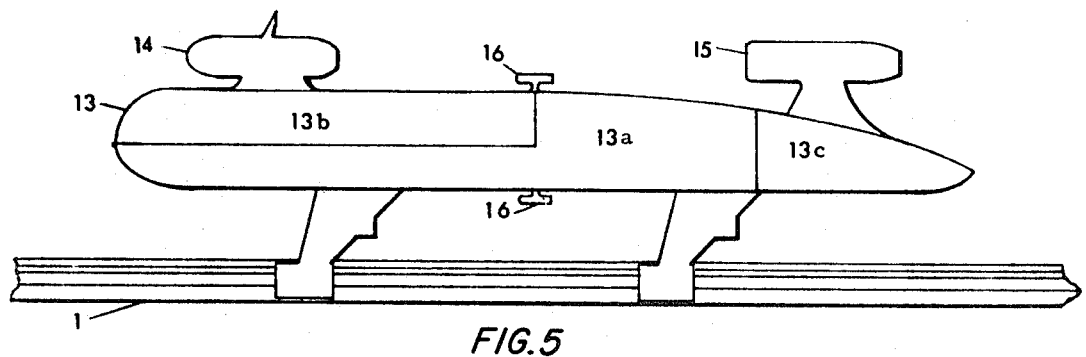
FIG. 5 is a side elevation of one form of the invention.
Figure 6:
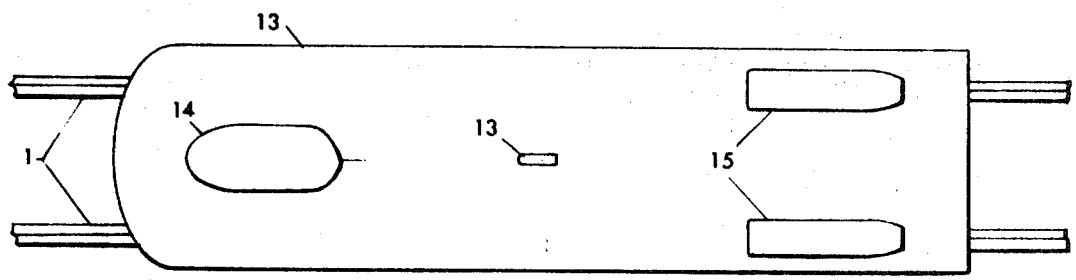
FIG. 6 is a top plan view of the vehicle of FIG. 5.

In detail, and first with reference to FIGS. 5 and 6, the invention comprises a streamlined vehicle 13 adapted to move along the length of a track 1 which is formed as shown in FIG. 1 to provide a pair of upper slanting surfaces 2 and opposite outwardly directed concave recesses defined by surfaces 3, 4 and 5. Adapted to cooperate with said surfaces are an upper pad 8 and a lower pad 9 to which fluid under pressure from compressors (not shown) is directed to the associated surfaces to maintain the vehicle in a predetermined position relative to the rail 1. Such fluid may be conducted through conduit 6 and connected to an air compressor located in compartment 13c of the vehicle. Check valves 7 are utilized to regular the flow of fluid into the spaces indicated at 10 between the pads and the rail structure.

Figure 3:
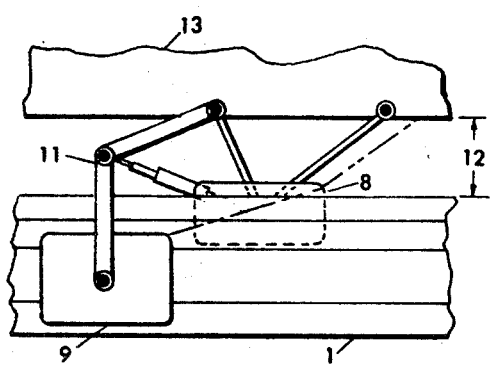
FIG. 3 is a fragmentary side elevation of a vehicle showing the mechanism connecting the vehicle to the track.
Figure 4:
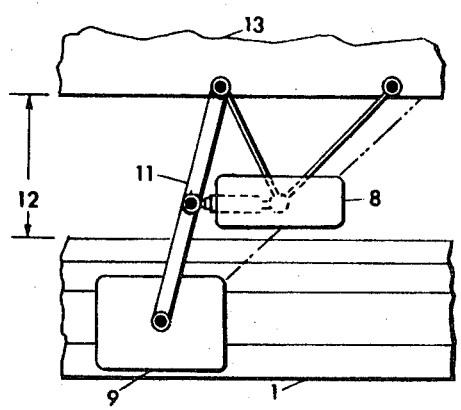
FIG. 4 is a view similar to FIG. 3 showing the position of the vehicle and mechanism when the vehicle is airborne.

The vehicle 13 is interconnected with the rail structure 1 by a linkage shown in FIGS. 3 and 4 which includes a pair of connecting links pivoted together at 11, and permitting the vehicle to move upwardly relative to the rail structure 1 from the lower position shown in FIG. 3 to the upper position shown in FIG. 4. In the latter position the pad 8 is spaced upwardly from the associated surface of the rail structure 1 and the fluid flow to pad 8 is turned off.

At this point it may be noted that an important distinction of the present invention over the prior art resides in the fact that the vehicle 13 moves from a position closely adjacent the track 1 and spaced from the latter a distance indicated by the numeral 12 to a position shown in FIG. 4 wherein the distance 12 from the track is greatly increased due to the linkage indicated so that the friction effects due to proximity to the rail structure are eliminated. This upward movement of the vehicle results from the fact that the vehicle 13 is in the form of an airfoil, the upper surface of the same being longer in length than the lower surface, and at high speeds the lift resulting from the airfoil, section causes the vehicle to become airborne and be spaced apart a sufficient distance from the rail structure 1 to eliminate the friction effects normally present in prior art devices using air cushion supports. It is emphasized that the vehicle is actually in flight in the position of FIG. 4, sufficient thrust being imparted to the vehicle by means of jet engines 15.

In one form of the invention shown in FIG. 5 the area 13a may be devoted to passengers, the area 13b may be employed for cargo and area 13c employed for air pressurization equipment and fuel. The compartment 14 above the main body portion of the vehicle is the operational control area for personnel and various types of computer equipment employed for controlling the vehicle.

It will be apparent that the vehicle and its associated structure shown in FIG. 1 to 5 provide a novel high speed ground transportation system which distinguishes from the prior art in that the vehicle actually becomes airborne at speeds in the order of 300 to 600 miles per hour.

Figure 7:
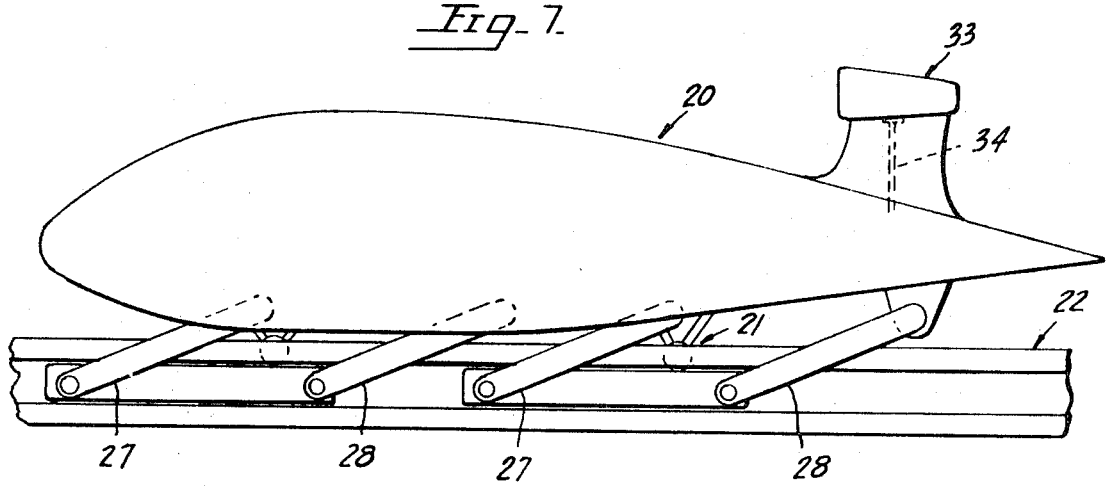
FIG. 7 is a side elevation of another form of the invention.

Another embodiment of the invention is shown in FIG. 7 wherein the streamlined vehicle again has an airfoil section which provides lift at high speeds so that the vehicle becomes airborne. In this case the vehicle 20 is provided with a retractable ground wheel system 21 which is used when the vehicle is stopped or traveling at slow speeds.

Figure 2:
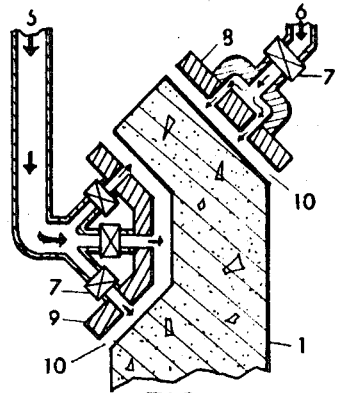
FIG. 2 is an enlarged cross sectional view of one side of the track of FIG. 1 showing the air pressure pads of the vehicle cooperating therewith.
Figure 8:
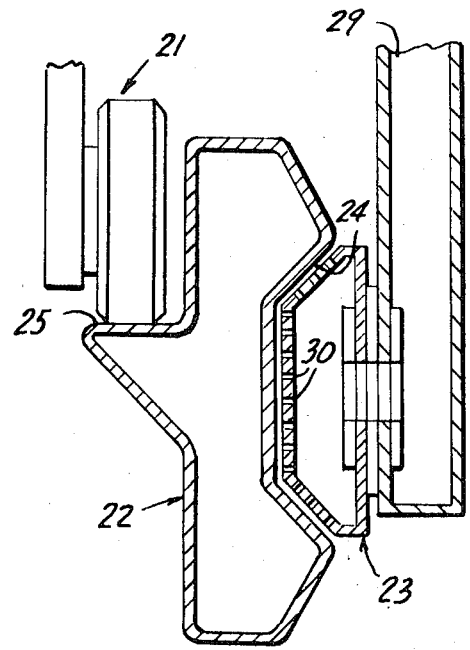
FIG. 8 is a transverse sectional view of the support mechanism of FIG. 7 in association with a different form of track.

In this case the upper pressure pad of FIG. 2 is eliminated and only two pads 23 on each side are employed, said pads being adapted to register with an outwardly opening concave surface 24 (FIG. 8) to provide the required vertical and horizontal stability. The track 22 is preferably of hollow cross section and includes an upwardly directed shoulder 25 along its inner side to support the wheeled running gear 21. Each pad 23 is connected to the vehicle by a pair of struts 27, 28 which are pivotally connected at their opposite ends to the vehicle and to the pad to provide a parallelogram connection permitting the vehicle 20 to move to a position spaced a considerable distance from the track 22. The struts 27, 28 are hollow to provide a conduit 29 through which air under pressure is conducted to the pads 23 and then outwardly through holes 30 to provide the required air cushion effect spacing the pad 23 slightly away from the concave surface 24.

As in the previously described embodiment the vehicle 20 may be propelled by a pair of jet engines 33 and in this case bleed off lines 34 connected to the jet engines behind the compressor portions thereof and to the conduits 29 to provide the required fluid pressure for the pads 23.

Still another form of the invention is shown in FIGS. 9 and 10 wherein the vehicle 40 is formed to provide a symmetrical airfoil with no built-in lift thereby eliminating induced drag except that attributable to the angle of attack which at no time would be more than a few degrees. In this case the lift is achieved by means of separate airfoils 41,42 supported upwardly from the vehicle 40 by pairs of struts 43,44 said struts also being employed to support the jet engines 45. By employing a symmetrical airfoil in this case for the vehicle body the center of pressure movement is minimized as is the induced drag so far as the vehicle body is concerned. A further reduction in power loss may be achieved by modifying the forward external surface of the airfoil along the front half of the vehicle to provide boundary line control as indicated schematically in FIG. 9. In this form of the invention it is contemplated that operation of the control surfaces of airfoils 41,42 may be achieved by the use of an accelerometer or rate gyro in the vehicle to give an analog electrical output to a shaping and integrating network to provide steering commands to a high response servo which would control the rudder deflection angle.

In FIG. 9 only one pressure pad 47 is employed on each side and each is pivotally connected to one end of a hollow strut 48 which is pivotally connected at its other end to the vehicle. This arrangement not only permits the vehicle to move upwardly away from the track 49 but also allows a change of attitude of the vehicle to provide additional lift at takeoff.

In the arrangement of FIGS. 9 and 10 the airfoils 41,42 are relied on to provide the required lift at high speed and also to provide the control of the vehicle. When the vehicle is airborne the main body portion preferably has an attitude of no angle of attack so that the induced drag is minimized and is attributable only to the induced drag of airfoils 41,42.

Figure 11:
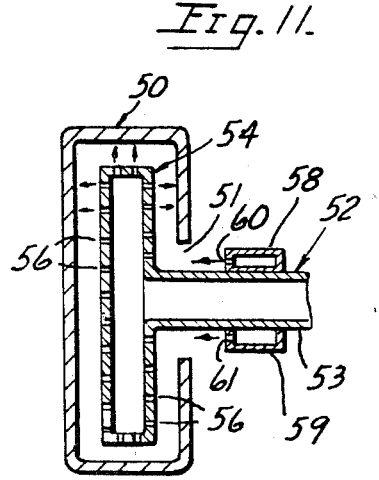
FIG. 11 is a cross section through a modified air cushion pad.

A modified form of pressure pad and track is shown in the cross-sectional view of FIG. 11 wherein the track is generally designated 50 and has a generally elongated rectangular tabular form but with an inwardly opening slot 51 formed along the inner side of said track. The strut structure generally designated 52 which connects the vehicle to the track includes a terminal portion 53 which extends through the slot 51 and is provided with a generally elongated tabular enlarged portion 54 which is spaced from the inner sides of the track as indicated. Air under pressure in conducted through portion 52 and out apertures 56 to provide the desired cushion effect. However, in this case a greater than normal clearance between the portion 54 and the track 50 may be achieved by directing air under a relatively higher pressure into the slot 51 at the portions thereof on opposite sides of the strut portion 52 as indicated. This high pressure air may be conducted through conduits 58,59 which are provided with apertures 60,61 for directing the air into the slot 51. By this structure, although the low pressure air emitted from apertures 56 can still escape from the opposite ends of the pad, escape through the slot 51 is deterred by the high pressure air from apertures 60,61. The structure of FIG. 11 may thus be employed to permit greater clearances between the pad and the rail than have been possible heretofore.

I claim:

1. In combination with an elongate generally horizontally extending fixed track, a vehicle positioned above said track and adapted to move along the length thereof, a support member adapted to move longitudinally of said track restrained against vertical and lateral movement relative to said track and in gas-cushioned relationship therewith, means carried by said vehicle providing an aerodynamic airfoil so that an upwardly directed lifting force opposed to gravity is created on said vehicle upon movement of the same along said track at a relatively high speed compared to wheeled vehicles, and a rigid arm pivotally connected at one end to opposite vehicle and at its opposite end to said support for permitting said vehicle to be positioned at various distances from said track up to a maximum predetermined distance.

2. The combination according to claim 1 wherein said arm is provided at its lower end with a surface complementarily formed relative to a similar surface on said track, means conveying air to the space between said surface to provide a cushion therebetween.

3. The combination according to claim 1 wherein said vehicle includes ground wheels adapted to engage said track when the spacing between said vehicle and said track is a minimum.

4 The combination of claim 1 wherein the means for providing said airfoil is the body of the vehicle.

5. The combination of claim 1 wherein the body of said vehicle is a symmetrical airfoil having no inherent lift characteristics and wherein a separate airfoil carried by said body and space therefrom provides the necessary lift.

6. The combination of claim 1 wherein air under a greater pressure than that of said air cushion is directed to the space between said surface of said arm and the complementary formed surface of said rail to permit greater clearances between said surfaces.